(12) United States Patent
Watanabe et al.

(10) Patent No.: US 11,897,548 B2
(45) Date of Patent: Feb. 13, 2024

(54) AIRFLOW ADJUSTING APPARATUS

(71) Applicant: SUBARU CORPORATION, Tokyo (JP)

(72) Inventors: Naoto Watanabe, Tokyo (JP); Yusaku Dogahira, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 329 days.

(21) Appl. No.: 17/369,435

(22) Filed: Jul. 7, 2021

(65) Prior Publication Data

US 2022/0033011 A1 Feb. 3, 2022

(30) Foreign Application Priority Data

Jul. 30, 2020 (JP) .................................. 2020-128751

(51) Int. Cl.
*B62D 35/02* (2006.01)
*H05H 1/24* (2006.01)
(52) U.S. Cl.
CPC ........... *B62D 35/02* (2013.01); *H05H 1/2439* (2021.05)
(58) Field of Classification Search
None
See application file for complete search history.

(56) References Cited

U.S. PATENT DOCUMENTS

2009/0085371 A1 4/2009 Nagahama
2017/0297634 A1 10/2017 Han et al.
2019/0342985 A1* 11/2019 Dadheech ............ H05H 1/2439
2019/0344837 A1 11/2019 Toki et al.
2020/0207429 A1 7/2020 Favaretto

FOREIGN PATENT DOCUMENTS

| CN | 110466434 A | 11/2019 |
| DE | 102019000358 A1 | 7/2020 |
| JP | 2006-290229 A | 10/2006 |
| JP | 2010-119946 A | 6/2010 |
| JP | 2013-151203 A | 8/2013 |
| JP | 2017-065444 A | 4/2017 |

OTHER PUBLICATIONS

Japanese Office Action 2020-128751 dated Nov. 28, 2023 with English translation thereof.

* cited by examiner

*Primary Examiner* — Todd Melton
(74) *Attorney, Agent, or Firm* — MCGINN I.P. LAW GROUP, PLLC

(57) ABSTRACT

An airflow adjusting apparatus to be provided in a vehicle includes a road clearance detector, an airflow generator, and a processor. The vehicle includes a vehicle body, a wheel attached to the vehicle body to be partly protruded downward from the vehicle body, and a suspension that holds the wheel to permit the wheel to make a vertical stroke relative to the vehicle body. The road clearance detector is configured to detect a road clearance. The road clearance is a vertical distance from a road surface to an underside of the vehicle body. The airflow generator is provided in an underneath of the vehicle body, and configured to generate an airflow. The processor is configured to allow the airflow generator to generate a downward airflow having a downward speed component, on the condition that the road clearance has been on the increase.

9 Claims, 8 Drawing Sheets

AIRFLOW ADJUSTING APPARATUS

CROSS-REFERENCE TO RELATED APPLICATIONS

This application claims priority from Japanese Patent Application No. 2020-128751 filed on Jul. 30, 2020, the entire contents of which are hereby incorporated by reference.

BACKGROUND

The disclosure relates to an airflow adjusting apparatus that adjusts airflows under a vehicle body of a vehicle such as an automobile.

Around a vehicle body of a vehicle such as an automobile, relative winds, or so-called traveling winds, occur. Relative winds are airflows that move relative to the vehicle body in accompaniment with travel of the vehicle.

Such relative winds form, for example, a turbulent flow accompanied by a vortex flow, around the vehicle body. This causes an increase in air resistance of the vehicle, contributing to aggravation of fuel consumption and high-speed traveling performance. Relative winds also constitute a cause of aerodynamic noise, or so-called wind noise, and aerodynamic vibration.

In recent years, proposals have been made for airflow adjustment around the vehicle body with the use of a device that actively generates an airflow.

For example, Japanese Unexamined Patent Application Publication (JP-A) No. 2010-119946 describes airflow adjustment near a surface of a vehicle body with the use of a plasma actuator. The plasma actuator includes an electrode pair that generates an air flow by plasma generation.

SUMMARY

An aspect of the technology provides an airflow adjusting apparatus to be provided in a vehicle. The vehicle includes a vehicle body, a wheel attached to the vehicle body to be partly protruded downward from the vehicle body, and a suspension that holds the wheel to permit the wheel to make a vertical stroke relative to the vehicle body. The airflow adjusting apparatus includes a road clearance detector, an airflow generator, and a processor. The road clearance detector is configured to detect a road clearance. The road clearance is a vertical distance from a road surface to an underside of the vehicle body. The airflow generator is provided in an underneath of the vehicle body, and configured to generate an airflow. The processor is configured to allow the airflow generator to generate a downward airflow having a downward speed component, on the condition that the road clearance has been on the increase.

An aspect of the technology provides an airflow adjusting apparatus to be provided in a vehicle. The vehicle includes a vehicle body, a wheel attached to the vehicle body to be partly protruded downward from the vehicle body, and a suspension that holds the wheel to permit the wheel to make a vertical stroke relative to the vehicle body. The airflow adjusting apparatus includes a road clearance detector, an airflow generator, and a processor. The road clearance detector is configured to detect a road clearance. The road clearance is a vertical distance from a road surface to an underside of the vehicle body. The airflow generator is provided in an underneath of the vehicle body, and configured to generate an airflow. The processor is configured to allow the airflow generator to generate a backward airflow having a backward speed component, on the condition that the road clearance has been on the decrease.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
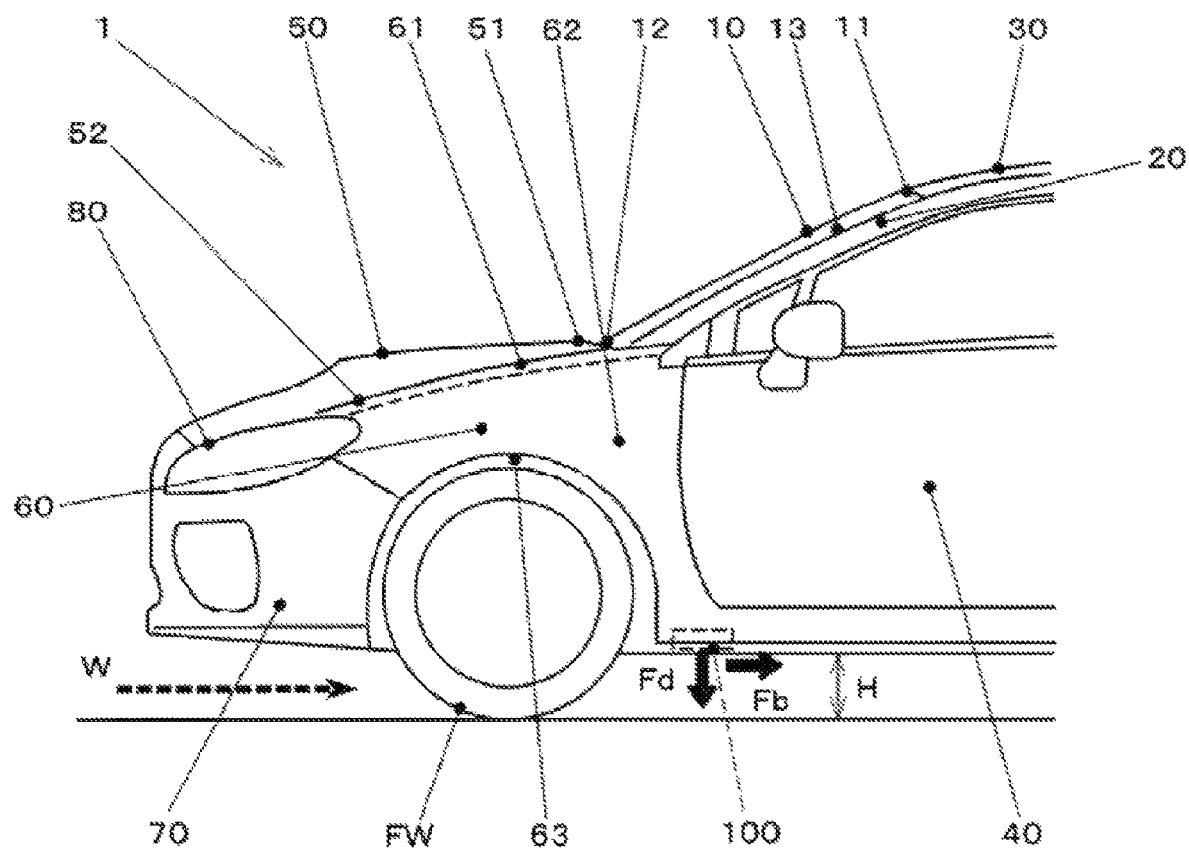
FIG. 1 is a schematic side view of a front portion of a vehicle body of a vehicle including an airflow adjusting apparatus according to a first embodiment of the disclosure.

When a vehicle gets over a protrusion, or a bump, in a road surface, the vehicle sometimes makes behavior such as pitching that causes changes in a road clearance, i.e., a gap between an underside of a vehicle body and the road surface. Such behavior may impair aerodynamic balance under the vehicle body, contributing to generation of, for example, a turbulent flow accompanied by a vortex flow. This worsens riding comfort because of aerodynamic vibration, and also causes an increase in air resistance.

It is desirable to provide an airflow adjusting apparatus that makes it possible to adjust appropriately airflows between an underside of a vehicle body and a road surface in a case with changes in a road clearance.

First Embodiment

Some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same reference characters to avoid redundant description, and elements not in direct relation to the technology may not be illustrated.

In the following, an airflow adjusting apparatus according to a first embodiment of the disclosure is described The airflow adjusting apparatus according to the first embodiment may be provided in, for example, an automobile, or a moving body. The automobile may be, for example, a passenger car of a so-called two-box or three-box vehicle shape that includes an engine room in front of a cabin.

FIG. 1 is a schematic side view of a front portion of a vehicle body of a vehicle including the airflow adjusting apparatus according to the first embodiment.

A vehicle 1 may include, without limitation, a windshield 10, a front pillar 20, a roof 30, a front door 40, a hood 50, a fender 60, a bumper face 70, and a front combination lamp 80.

The windshield 10 is a glass window provided in a front portion of the cabin. The windshield 10 may have a substantially rectangular shape. The windshield 10 may be disposed in a backward tilted attitude, with an upper end 11 positioned on rear side of the vehicle relative to a lower end 12.

A side end 13 of the windshield 10 may be disposed along the front pillar 20. The windshield 10 may include laminated glass of a quadric surface, and be curved or rounded to protrude toward front side of the vehicle.

The front pillar 20, or an A pillar, is a vehicle body structural member that extends along the side end 13 of the windshield 10.

A back end of the front pillar 20 may be disposed in adjacency to a sash provided around a front glass door in an upper portion of the front door 40.

The roof 30 is a panel that constitutes an upper surface of the cabin.

The roof 30 may extend, from the upper end 11 of the windshield 10, toward the rear side of the vehicle.

The front door 40 may be an openable and closeable door provided in a side surface of the front portion of the cabin.

The front door 40 may open or close by pivoting around an unillustrated hinge provided at a front end of the front door 40.

The hood 50 is an exterior member provided over an upper portion of the engine room. The hood 50 may be a lid-shaped body of an open and close type.

A rear edge 51 of the hood 50 may be disposed in front of the lower end 12 of the windshield 10, in spaced relation from the lower end 12 in a vehicle longitudinal direction.

A side edge 52 of the hood 50 may be disposed in adjacency to a vehicle-widthwise inner edge of an upper surface 61 of the fender 60, with a gap in between. The gap is unavoidably provided.

The fender 60 is an exterior member of the vehicle that constitutes, for example, a side surface of the engine room.

The fender 60 may include, without limitation, the upper surface 61 and a side surface 62.

The upper surface 61 is a region adjacent to a side end of the side edge 52 of the hood 50. The upper surface 61 may be formed to trace broadly a curved plane extending vehicle-widthwise outward from a curved plane of an outer surface of the hood 50.

The side surface 62 may extend downward from the vicinity of a vehicle-widthwise outer end of the upper surface 61.

Moreover, the side surface 62 may have an arcuate notch 63 of a wheel house that houses a front wheel FW.

The front wheel FW may be disposed with its main portion housed in the wheel house, and with its lower portion protruded downward from an underside of the vehicle body.

The bumper face 70 is a resin-made exterior member provided in a lower portion of a front end of the vehicle.

The bumper face 70 may be provided in front of the arcuate notch 63 in the fender 60.

The front combination lamp 80 may include various lighting devices housed and unitized in a common housing. Non-limiting examples of the lighting devices may include a headlamp, a position lamp, and a turn signal lamp.

The front combination lamp 80 may be disposed on lower side of the hood 50 and on upper side of the bumper face 70 at the front end of the vehicle.

On the underside of the vehicle body of the vehicle 1, or on a lower surface of a floor panel, a plasma actuator 100 described below is provided. The plasma actuator 100 may adjust relative winds W, or so-called traveling winds, flowing under a floor of the vehicle at the occasion of pitching behavior.

The plasma actuator 100 is supplied with predetermined alternating or DC (direct-current) electric power, to generate an airflow. In one embodiment of the disclosure, the plasma actuator 100 may serve as an "airflow generator".

Details of a configuration and operation of the plasma actuator 100 are described below.

Figure 2:
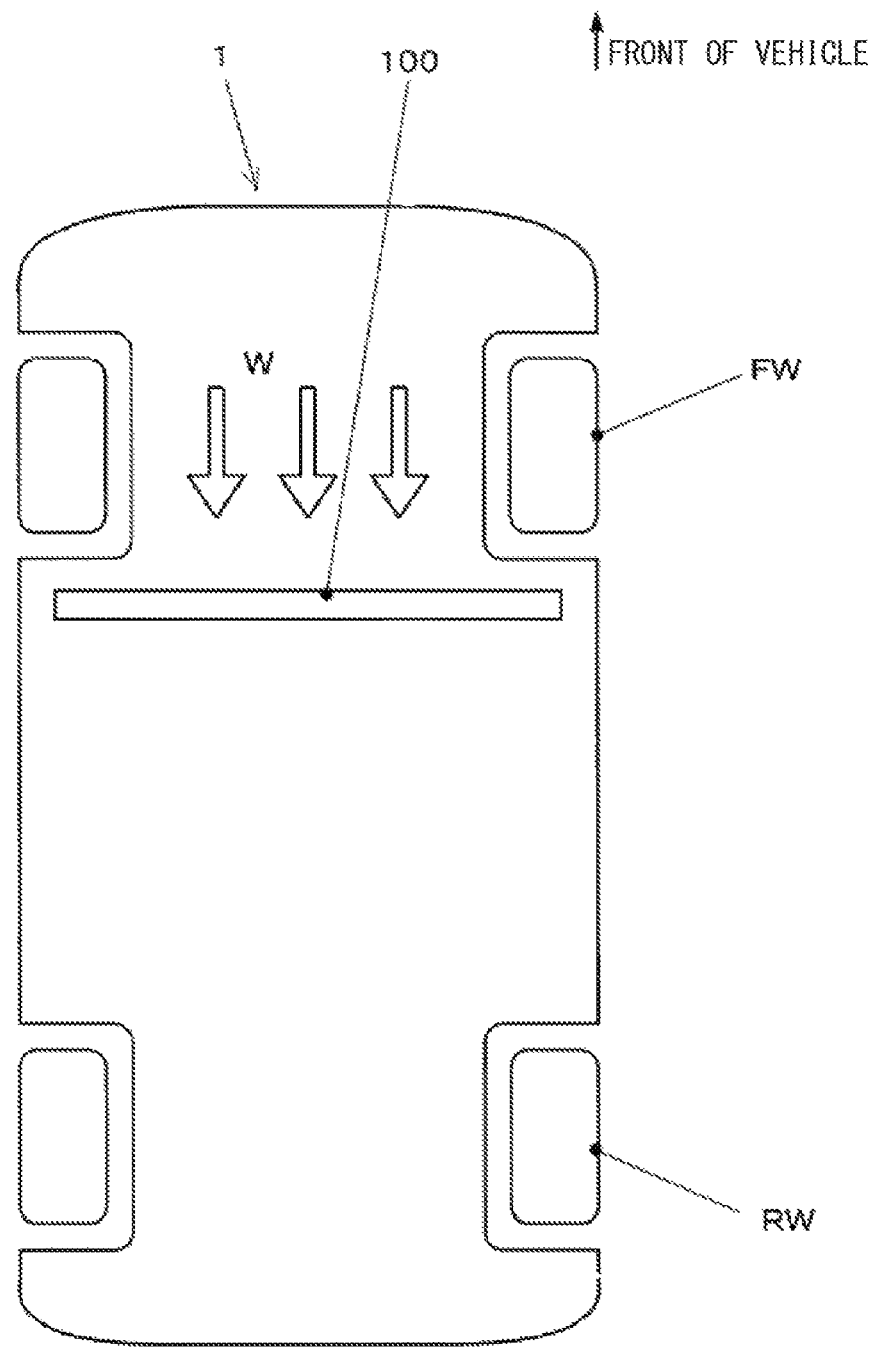
FIG. 2 schematically illustrates the vehicle according to the first embodiment, as viewed from underneath.

FIG. 2 schematically illustrates the vehicle of the first embodiment, as viewed from underneath.

As illustrated in FIGS. 1 and 2, the plasma actuator 100 is provided in an underneath of the vehicle body. The plasma actuator 100 may be provided immediately behind the front wheel FW, between the front wheel FW and a rear wheel RW, or midway in a wheelbase.

The plasma actuator 100 may have a band shape, with its longitudinal direction aligned with a direction orthogonal to a direction of airflow generation.

The plasma actuator 100 may be disposed substantially over an entire width of the vehicle, with its longitudinal direction aligned with a vehicle widthwise direction.

The plasma actuator 100 is configured to generate a downward airflow Fd and a backward airflow Fb. The downward airflow Fd moves downward of the vehicle. The backward airflow Fb moves backward of the vehicle. See FIGS. 1, 7, and 8.

In the following, the configuration of the plasma actuator 100 is described in more detail.

Figure 3:
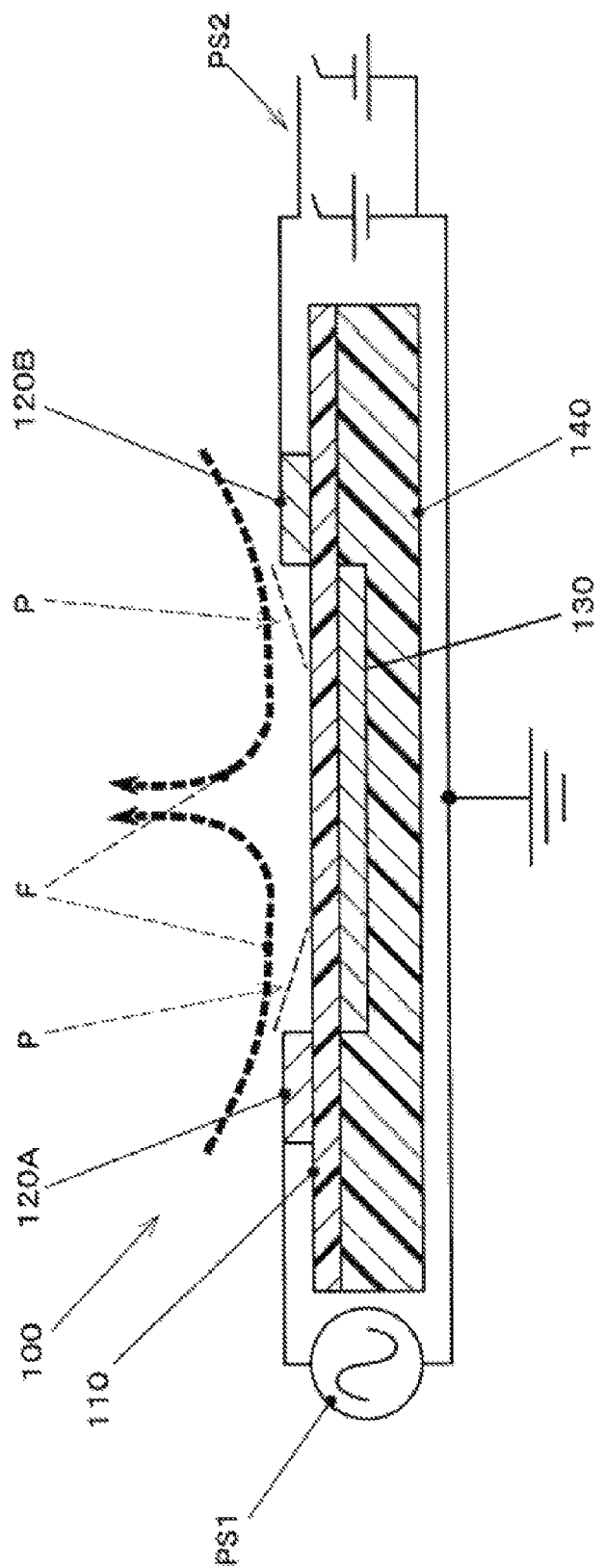
FIG. 3 is a schematic cross-sectional view of a three-pole plasma actuator to be provided in the airflow adjusting apparatus according to the first embodiment.

FIG. 3 is a schematic cross-sectional view of a three-pole plasma actuator to be provided in the airflow adjusting apparatus of the first embodiment.

The three-pole plasma actuator 100 may include, without limitation, a dielectric 110, upper electrodes 120A and 120B, a lower electrode 130, and an insulator 140. The upper electrodes 120A and 120B may be also collectively referred to as upper electrodes 120.

The dielectric 110 may be a sheet-shaped member including, for example, a fluorocarbon resin such as polytetrafluoroethylene.

The upper electrodes 120 and the lower electrode 130 may each include an electrically-conductive tape including a thin metal film of, for example, copper.

The upper electrodes 120 may be attached to outer surface side of the dielectric 110. The outer surface side of the dielectric 110 refers to side exposed to the outside when the plasma actuator 100 is attached to, for example, the vehicle body.

The lower electrode 130 may be attached to inner surface side of the dielectric 110 that is opposite to the outer surface side of the dielectric 110.

The upper electrodes 120 and the lower electrode 130 may be offset in an in-plane direction of the dielectric 110.

In the three-pole plasma actuator 100 as illustrated in FIG. 3, a pair of the upper electrodes 120, i.e., the upper electrodes 120A and 120B, may be disposed in symmetry on both sides of the lower electrode 130. For the upper electrodes 120A and 120B, independent power supplies PS1 and PS2 may be provided respectively.

The insulator 140 may be a sheet-shaped member that serves as a base of the plasma actuator 100. The insulator 140 may be provided, on the inner surface side of the dielectric 110, to cover the lower electrode 130.

Between the upper electrode 120A and the lower electrode 130 of the plasma actuator 100, an alternating voltage having a predetermined waveform may be applied by the power supply PS1.

Between the upper electrode 120B and the lower electrode 130, a polarity switchable DC voltage may be applied by the power supply PS2.

Applying such voltages causes generation of a plasma discharge P between each pair of the electrodes.

It is necessary for the applied voltages by the power supplies PS1 and PS2 to be high enough to cause electrical breakdown and generate the plasma discharge P. For example, the applied voltage may range from about 1 kV to about 10 kV.

In a case where the applied voltage is an alternating voltage or a pulsed DC voltage, a frequency of the applied voltage may range, for example, from about 1 kHz to about 10 kHz.

At this occasion, the air on outer surface side of the plasma actuator 100 is drawn to the plasma discharge P, causing generation of an airflow F in a wall jet flowing along the dielectric 110.

Moreover, the plasma actuator 100 is configured to reverse a direction of the airflow F, by controlling the waveform and polarity of the alternating voltage to be applied.

The three-pole plasma actuator 100 as mentioned above is configured to generate the airflows F opposite to each other, with the use of, for example, the plasma discharge P produced between the upper electrode 120A and the lower electrode 130 and the plasma discharge P produced between the upper electrode 120B and the lower electrode 130.

In one embodiment of the disclosure, the upper electrode 120A and the lower electrode 130 may serve as a "first electrode pair".

In one embodiment of the disclosure, the upper electrode 120B and the lower electrode 130 may serve as a "second electrode pair".

In this case, the opposite airflows F collide and join together, or combine, while being deflected, to form a composite airflow moving along a direction that draws away from a main plane of the plasma actuator 100, e.g., typically, along a normal direction.

Moreover, in the three-pole plasma actuator 100, energizing solely the upper electrode 120A or the upper electrode 120B makes it possible to generate an airflow moving along a surface of the relevant upper electrode 120A or 120B.

Furthermore, controlling, for example, a voltage to be applied to the upper electrodes 120A and 120B makes it possible to control a direction of movement of the airflow after joining together.

It is to be noted that in the first embodiment, because the plasma actuator 100 is provided on the underside of the vehicle body, the plasma actuator 100 is actually mounted upside down relative to FIG. 3.

The airflow adjusting apparatus of the first embodiment may include a control system described below, to control the generation of the airflow, e.g., the downward airflow Fd and the backward airflow Fb, by the plasma actuator 100.

Figure 4:
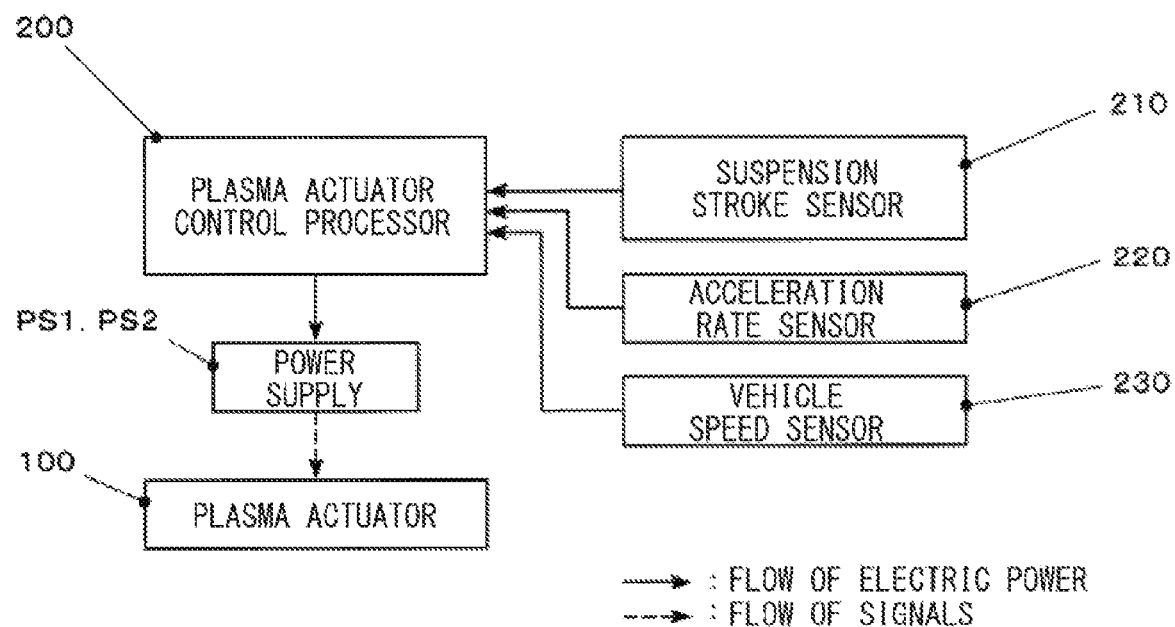
FIG. 4 is a schematic block diagram illustrating a configuration of a control system that controls the plasma actuator in the airflow adjusting apparatus according to the first embodiment.

FIG. 4 is a schematic block diagram illustrating a configuration of the control system that controls the plasma actuator in the airflow adjusting apparatus of the first embodiment.

The control system may include, without limitation, a plasma actuator control processor 200, a suspension stroke sensor 210, an acceleration rate sensor 220, and a vehicle speed sensor 230.

The plasma actuator control processor 200 may control the power supplies PS1 and PS2, to control directions and flow rates of the airflows Fd and Fb to be generated by the plasma actuator 100. The power supplies PS1 and PS2 may supply electric power to the plasma actuator 100.

The plasma actuator control processor 200 may include, for example, a microcomputer including, without limitation, an information processor such as a CPU (Central Processing Unit), a storage such as a RAM (Random Access Memory) and/or a ROM (Read Only Memory), input and output interfaces, and a bus that couples them together.

Details of operation of the plasma actuator control processor 200 are described later.

The suspension stroke sensor 210 may detect a stroke of an unillustrated suspension device. The suspension device holds the front wheel FW to permit the front wheel FW to make a vertical stroke relative to the vehicle body.

As the suspension device, for example, a McPherson strut suspension may be used.

In this case, an unillustrated shock absorber is disposed substantially coaxially with a suspension spring. An upper end of the shock absorber is attached to the vehicle body, while a lower end of the shock absorber is fastened to a hub bearing housing that holds the wheel.

The suspension stroke sensor 210 may include, for example, a position encoder that detects an amount of advancement of a piston rod relative to a shell case of the shock absorber.

The acceleration rate sensor 220 may detect a vertical acceleration rate of the vehicle body in the vicinity of the suspension device. That is, in the first embodiment, the acceleration rate sensor 220 may detect a vertical acceleration rate of the front portion of the vehicle body.

The vehicle speed sensor 230 may detect a traveling speed of the vehicle, or a vehicle speed.

The vehicle speed sensor 230 may be provided in, for example, a hub that rotatably holds the front wheel FW. The vehicle speed sensor 230 is configured to output a vehicle speed signal proportional to a rotational speed of the front wheel FW.

In one embodiment of the disclosure, the suspension stroke sensor 210 and the acceleration rate sensor 220 may serve in cooperation as a "road clearance detector".

Description is given next of a control in the airflow adjusting apparatus of the first embodiment.

Figure 5:
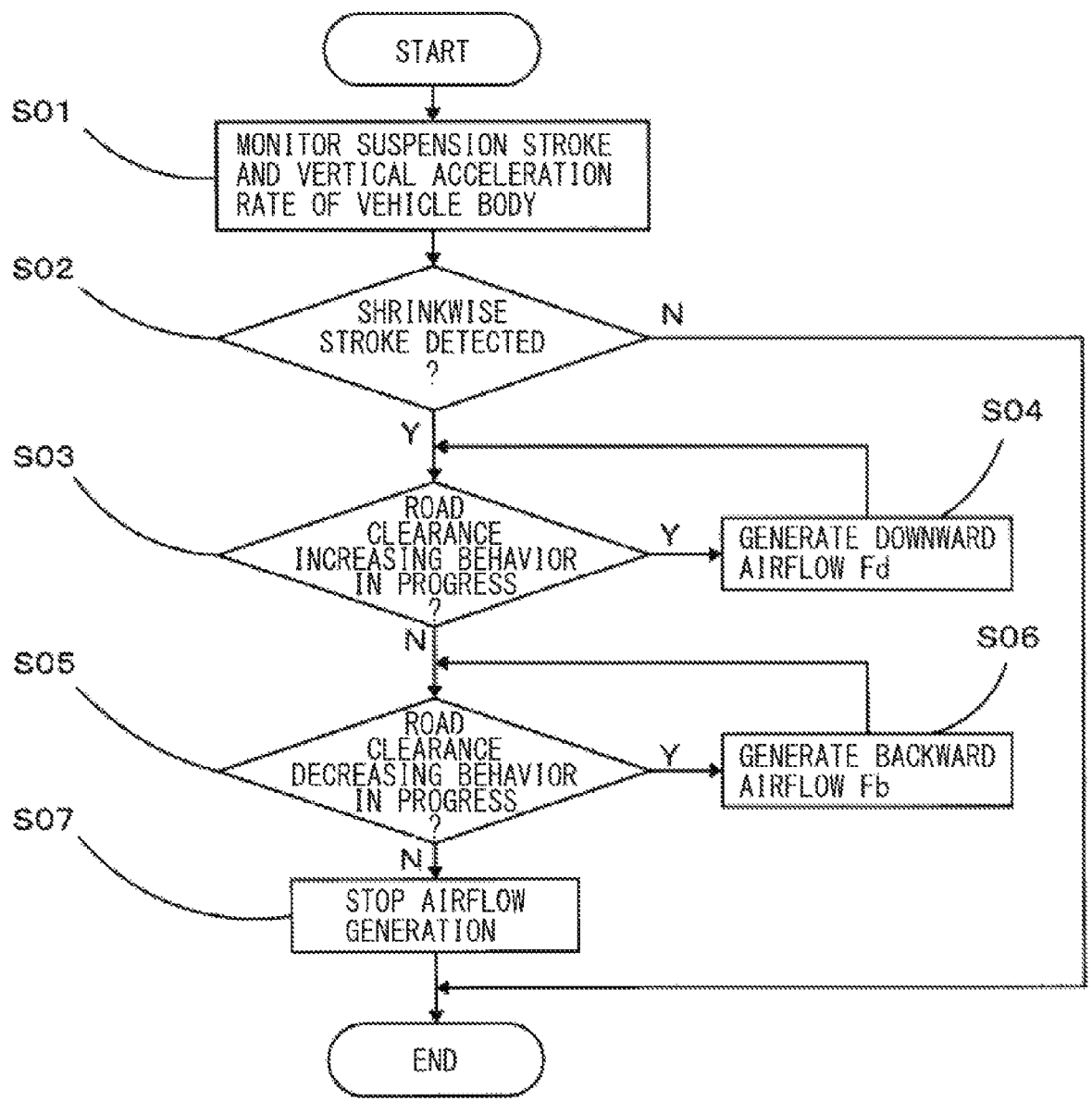
FIG. 5 is a flowchart of an airflow adjustment control in the airflow adjusting apparatus according to the first embodiment.

FIG. 5 is a flowchart of an airflow adjustment control in the airflow adjusting apparatus of the first embodiment.

In the following, description is given in the order of steps.
<Step S01: Monitor Suspension Stroke and Vertical Acceleration Rate of Vehicle Body>

While the vehicle 1 is traveling, the plasma actuator control processor 200 may monitor a stroke of a front suspension, and a vertical acceleration rate that acts on the vehicle body, on the basis of an output of the suspension stroke sensor 210 and an output of the acceleration rate sensor 220.

Thereafter, the flow may proceed to step S02.
<Step S02: Determine Detection of Shrinkwise Stroke>

The plasma actuator control processor 200 may determine, on the basis of the output of the suspension stroke sensor 210, presence or absence of a shrinkwise stroke of the front suspension of a predetermined amount or greater, at a predetermined stroke speed or higher. In other words, the plasma actuator control processor 200 may determine presence or absence of a vertical displacement of the front wheel FW.

In a case with the presence of such a stroke (Y in step S02), the flow may proceed to step S03. Otherwise (N in step S02), the flow may terminate the series of processing or return.
<Step S03: Determine Road Clearance Increasing Behavior>

The plasma actuator control processor 200 may detect, or estimate, a road clearance, on the basis of the output of the suspension stroke sensor 210 and the output of the acceleration rate sensor 220. The road clearance means a vertical gap between the underside of the vehicle body and the road surface in the vicinity of the plasma actuator 100. The plasma actuator control processor 200 may determine whether or not road clearance increasing behavior is in progress. The road clearance increasing behavior means behavior that causes the road clearance to tend to increase at a predetermined speed or higher.

Typical but non-limiting examples of such behavior may include pitching behavior in a nose-up direction on the occasion that the vehicle 1 passes a bump, or a protrusion, in the road surface.

In a case where such behavior is in progress (Y in step S03), the flow may proceed to step S04. Otherwise (N in step S03), the flow may proceed to step S05.
<Step S04: Generate Downward Airflow Fd>

The plasma actuator control processor 200 may allow the plasma actuator 100 to generate the downward airflow Fd that is jetted out downward toward the road surface.

Strength of the downward airflow Fd, e.g., an amount of flow and a flow rate, may be set to become greater, for example, in accordance with an increase in a rate of increase in the road clearance, and/or in accordance with an increase in the vehicle speed.

Thereafter, the flow may return to step S03, to repeat step S03 and subsequent processes.
<Step S05: Determine Road Clearance Decreasing Behavior>

The plasma actuator control processor 200 may determine whether or not road clearance decreasing behavior is in progress. The road clearance decreasing behavior means behavior that causes the road clearance as mentioned above to tend to lower or decrease at a predetermined speed or higher.

Typical but non-limiting examples of such behavior may include pitching behavior in a nose-down direction after the pitching behavior in the nose-up direction as mentioned above, i.e., after arrival at a top dead point where a nose rising speed becomes zero.

In a case where such behavior is in progress (Y in step S05), the flow may proceed to step S06. Otherwise (N in step S05), the flow may proceed to step S07.
<Step S06: Generate Backward Airflow Fb>

The plasma actuator control processor 200 may allow the plasma actuator 100 to generate the backward airflow Fb that is jetted out backward relative to the vehicle body along the lower surface of the floor panel.

Strength of the backward airflow Fb, e.g., an amount of flow and a flow rate, may be set to become greater, for example, in accordance with the increase in the rate of increase in the road clearance, or in accordance with the increase in the vehicle speed.

Thereafter, the flow may return to step S05, to repeat step S05 and subsequent processes.
<Step S07: Stop Airflow Generation>

The plasma actuator control processor 200 may stop the airflow generation by the plasma actuator 100, and terminate the series of processing or return.

Figure 6:
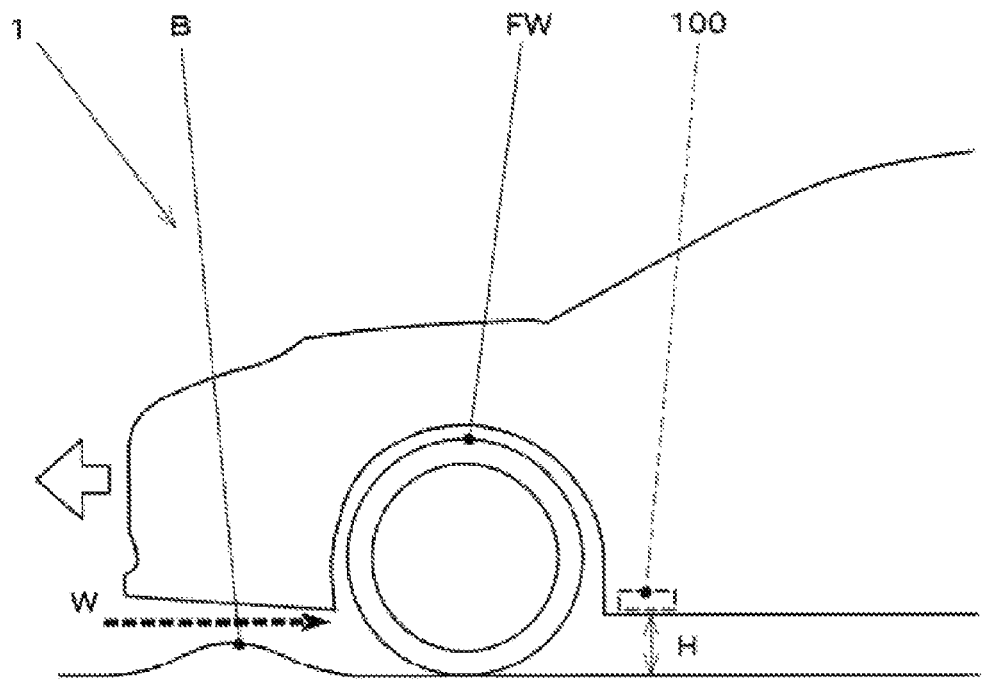
FIG. 6 schematically illustrates the vehicle including the airflow adjusting apparatus according to the first embodiment immediately before coming to a bump in a road surface.
Figure 7:
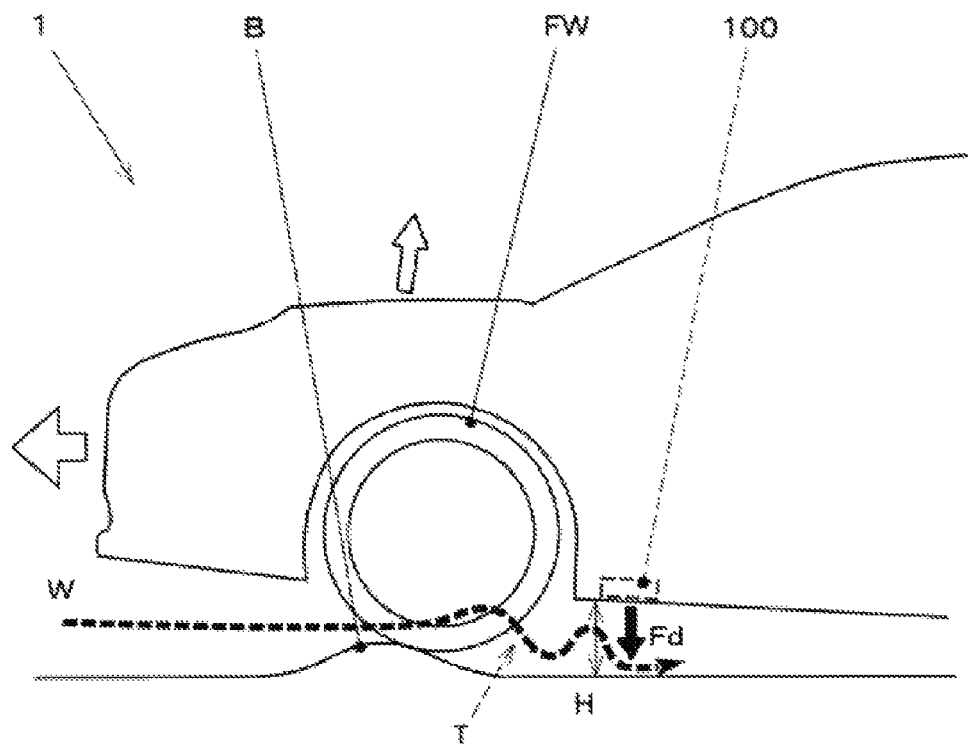
FIG. 7 schematically illustrates the vehicle including the airflow adjusting apparatus according to the first embodiment traveling on the bump in the road surface.
Figure 8:
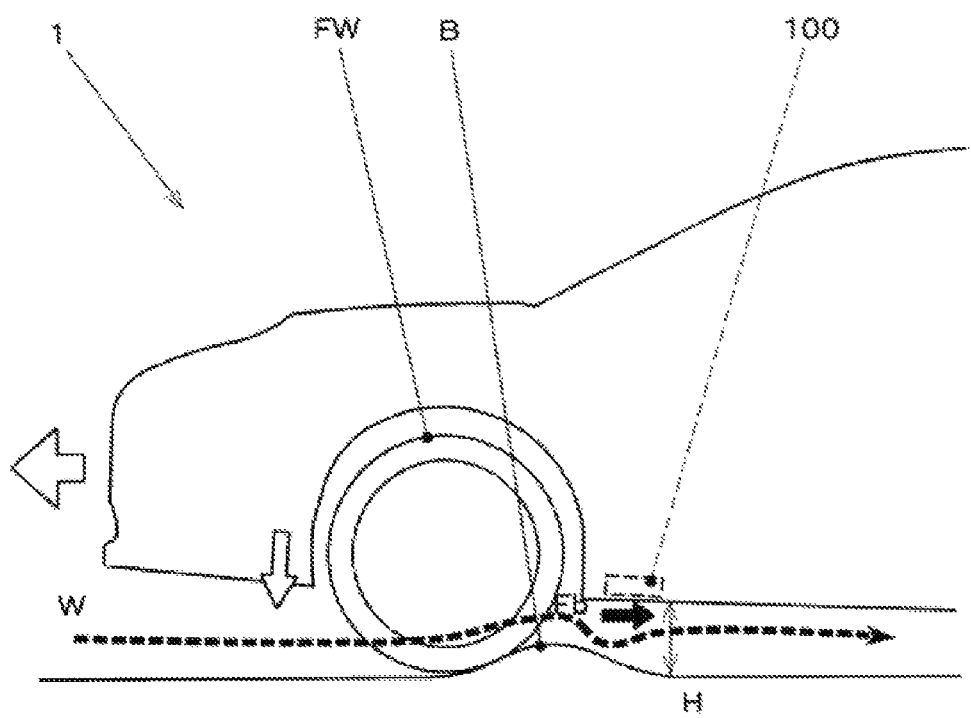
FIG. 8 schematically illustrates the vehicle including the airflow adjusting apparatus according to the first embodiment immediately after getting over the top of the bump in the road surface.

FIGS. 6 to 8 schematically illustrate, in time series, from a state immediately before the vehicle 1 passes a bump B, or a protrusion, in the road surface, to a state immediately after the vehicle 1 passes the bump B in the road surface.

FIG. 6 illustrates a state immediately before the vehicle 1 comes to the bump B in the road surface.

FIG. 7 illustrates a state that the vehicle 1 is traveling on the bump B in the road surface, or a state that the front wheel FW is climbing a slope on entrance side of the bump B.

FIG. 8 illustrates a state immediately after the vehicle 1 got over the top of the bump B in the road surface, or a state that the front wheel FW is descending a slope on exit side of the bump B.

In the state illustrated in FIG. 6, the vehicle 1 is in a state of traveling on a flat road, i.e., a so-called 1G state.

In a case where the vehicle is in a steady traveling state, flow rates and pressure of relative winds around the vehicle body are in a steady state, with predetermined balance maintained. The steady traveling state typically means that the vehicle is on straight travel at a constant vehicle speed.

Between the vehicle body and the road surface, a relative wind W, or a so-called traveling wind, flows in. The relative wind W is an airflow that flows relative to the vehicle body in accompaniment with the travel of the vehicle.

As illustrated in FIG. 7, when the front wheel FW runs on the slope on the entrance side of the bump B (on the right side in FIG. 7), the front suspension strokes shrinkwise, or toward the bump, causing the front wheel FW to rise relative to the vehicle body.

The front portion of the vehicle body is pushed up by an input from the front wheel FW and the front suspension, causing the pitching behavior in the nose-up direction, or a backward tilted direction.

At this occasion, the road clearance H increases. The road clearance H is a vertical gap between a front portion of the floor panel on which the plasma actuator 100 is provided, and the road surface.

This expands volume of space between the underside of the vehicle body and the road surface, causing negative pressure in the space. Thus, vortex T having a volume force is generated in the air. The vortex T normally moves upward by an inertial force of the air and collides with the vehicle body, causing air resistance, aerodynamic noise, and aerodynamic vibration.

In contrast, in the first embodiment, the plasma actuator 100 generates the downward airflow Fd to blow away the vortex T downward. Hence, it is possible to suppress the collision of the vortex T with the vehicle body.

As illustrated in FIG. 8, when the front wheel FW passes the top of the bump B and begins to come down the slope on the exit side (on the left side in FIG. 8 and other figures), the front suspension strokes expandwise, or reboundwise, causing the front wheel FW to lower relative to the vehicle body.

The input to the vehicle body in a pushing-up direction from the front wheel FW and the front suspension decreases, causing the pitching behavior in the nose-down direction, or a forward tilted direction.

At this occasion, the road clearance H around the floor panel on which the plasma actuator 100 is provided decreases.

As described, the volume of the space between the underside of the vehicle body and the road surface is reduced, causing the air in the space to be compressed while being stagnant at a lower speed than normally. However, in the first embodiment, the plasma actuator 100 generates the backward airflow Fb to accelerate the air compressed between the vehicle body and the road surface. Hence, it is possible to quickly blow away the compressed air backward of the vehicle.

As described, in the first embodiment, controlling the airflows Fd and Fb to be generated by the plasma actuator 100 in accordance with the pitching behavior that causes changes in the road clearance of the vehicle makes it possible to prevent the generation of vortex accompanying the changes in the road clearance, collision of the vortex with the vehicle body, and stagnation of the vortex under the vehicle body. Hence, it is possible to suppress aerodynamic noise, or wind noise, aerodynamic vibration, or swaying of the vehicle body, leading to smoother pitching behavior of the vehicle.

Moreover, it is possible to suppress air resistance of the vehicle 1, leading to enhancement in fuel consumption and high-speed traveling performance.

Furthermore, generating the airflows Fd and Fb with the use of the single, common three-pole plasma actuator 100 makes it possible to generate the airflows Fd and Fb with high responsiveness, and to obtain the effects described above, by the simple apparatus configuration devoid of movable components.

Second Embodiment

Description now moves on to an airflow adjusting apparatus according to a second embodiment of the disclosure.

The following description of the second embodiment is given mainly regarding differences from the forgoing first embodiment. Constituent elements common to those of the forgoing first embodiment are denoted by the same reference characters, and description thereof is omitted.

Figure 9:
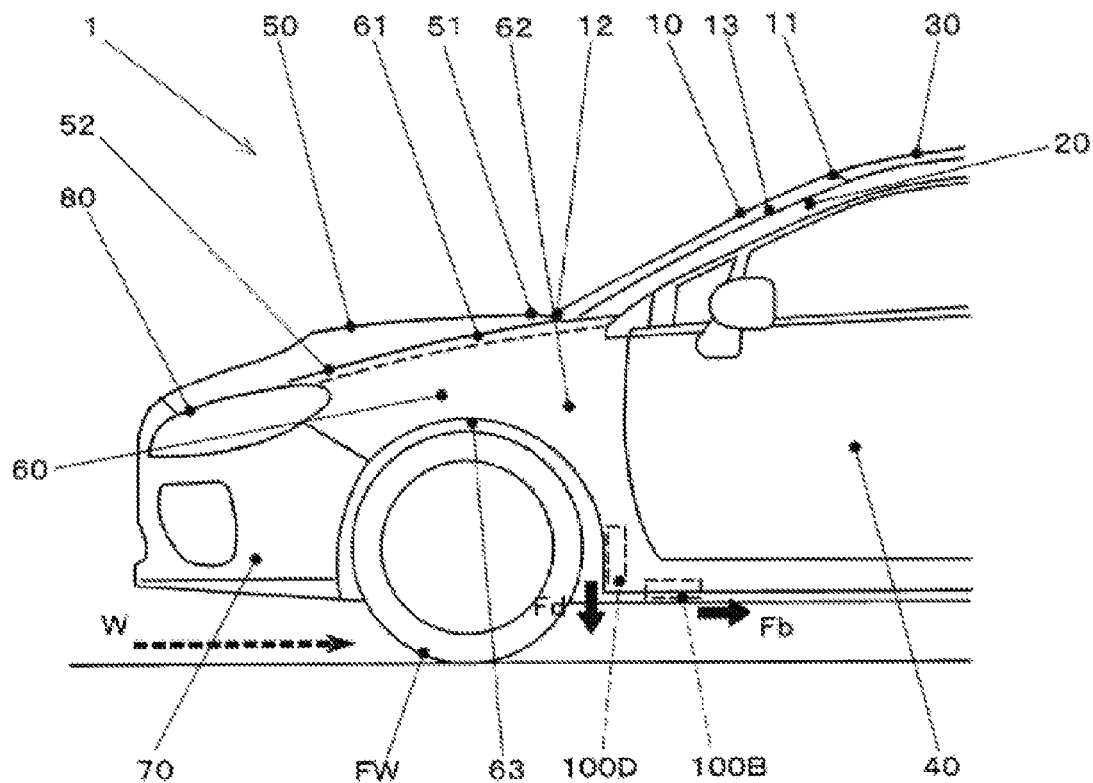
FIG. 9 is a schematic side view of a front portion of a vehicle body of a vehicle including an airflow adjusting apparatus according to a second embodiment of the disclosure.

FIG. 9 is a schematic side view of a front portion of a vehicle body of a vehicle including an airflow adjusting apparatus of the second embodiment.

In the second embodiment, the vehicle 1 may include a plasma actuator 100D and a plasma actuator 100B, instead of the three-pole plasma actuator 100 in the first embodiment. The plasma actuator 100D is configured to generate the downward airflow Fd. The plasma actuator 100B is configured to generate the backward airflow Fb.

The plasma actuator 100D may be disposed behind the wheel house.

The plasma actuator 100B may be disposed on the lower surface of the floor panel, immediately behind the plasma actuator 100D.

The plasma actuators 100D and 100B may have a similar configuration to a bipolar plasma actuator 100A described below.

Figure 10:
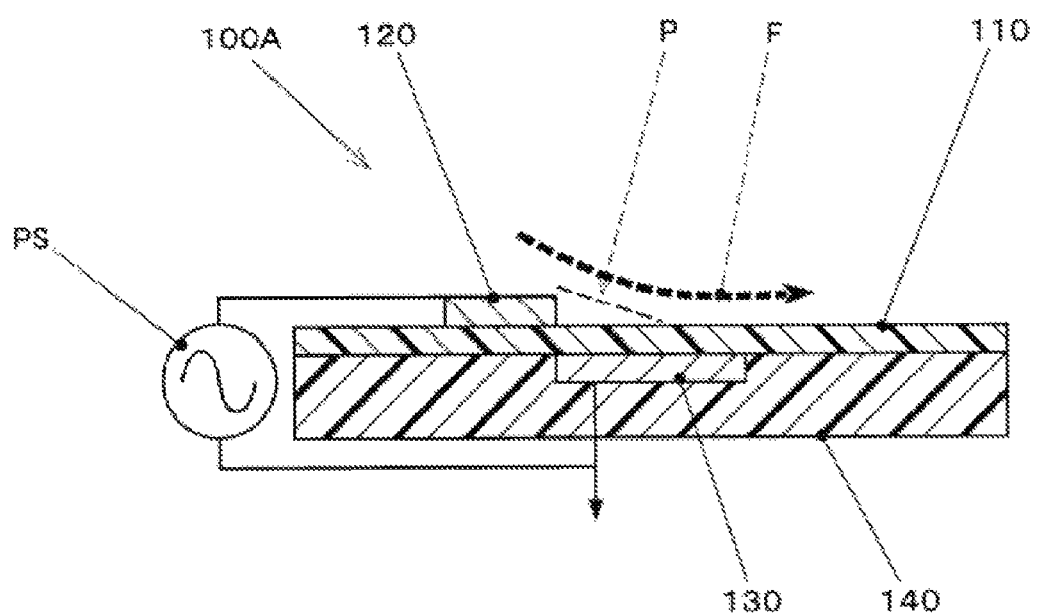
FIG. 10 is a schematic cross-sectional view of a bipolar plasma actuator to be provided in the airflow adjusting apparatus according to the second embodiment.

FIG. 10 is a schematic cross-sectional view of a bipolar plasma actuator to be provided in the airflow adjusting apparatus of the second embodiment.

In the bipolar plasma actuator 100A, the upper electrode 120 may be provided solely on one side of the lower electrode 130.

Between the upper electrode 120 and the lower electrode 130, an alternating voltage or a DC voltage may be applied by a power supply PS.

The bipolar plasma actuator 100A as mentioned above is configured to generate the airflow F in the wall jet flowing along the dielectric 110.

The plasma actuator 100D described above is equivalent to the plasma actuator 100A disposed to generate the downward airflow Fd, with a direction of airflow ejection directed downward.

The plasma actuator 100B is equivalent to the plasma actuator 100A disposed to generate the backward airflow Fb, with the direction of the airflow ejection directed backward.

In the forgoing second embodiment as well, it is possible to produce similar effects as the effects of the forgoing first embodiment.

Modification Examples

Although some embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

(1) The configurations of the vehicle and the airflow adjusting apparatus are not limited to the forgoing embodiments, but may be changed as appropriate.

For example, a vehicle shape and a vehicle type of the vehicle, and where to dispose the airflow generators may be changed as appropriate. The vehicle shape means a shape of an upper portion of the vehicle body. Non-limiting examples of the vehicle type may include a passenger car, a truck, a bus, and a special purpose vehicle. Moreover, the airflow generator may include a plurality of airflow generators, and the plurality of the airflow generators may be provided in a distributed arrangement in the vehicle longitudinal direction and/or in the vehicle widthwise direction.

(2) In the forgoing embodiments, the airflow generator is disposed just behind the front wheel and midway in the wheelbase between the front wheel and the rear wheel. However, such an arrangement is merely exemplary. For example, the airflow generator may be provided around the rear wheel or in a rear overhang behind the rear wheel. Even in this case, it is possible to prevent generation of vortex caused by negative pressure on the occasion of the changes in the road clearance in a rear portion of the vehicle body because of, for example, the pitching behavior. It is therefore possible to prevent such vortex from colliding with the vehicle body, or from flowing into a so-called cut-off region to impair aerodynamic balance around the vehicle body. The cut-off region means a region where relative winds become stagnant on the rear side of the vehicle body.

(3) In the forgoing embodiments, the plasma actuator may serve as the "airflow generator" in one embodiment of the disclosure, but this is non-limiting. Other devices may be used that generates airflows by other techniques.

(4) In the forgoing embodiments, the changes in the road clearance below the underside of the vehicle body is detected on the basis of the suspension stroke and the vertical acceleration rate of the vehicle body, but this is non-limiting. The changes in the road clearance may be detected by other techniques.

For example, a sensor, radar, or sonar of an electric wave type, an optical type, or an acoustic type may be provided in the underneath of the vehicle body to detect a relative distance to the road surface. Moreover, the pitching behavior of the vehicle may be estimated, on the basis of vertical deviation in images of a camera that captures images forward of an own vehicle, to calculate the changes in the road clearance.

(5) In the forgoing embodiments, a DC voltage is applied to one electrode pair of the three-pole plasma actuator while an alternating voltage is applied to the other electrode pair. However, such a configuration is merely exemplary and non-limiting.

For example, an alternating voltage may be applied to both electrode pairs, or alternatively, a DC voltage may be applied to both electrode pairs.

According to an aspect of the technology, an airflow adjusting apparatus includes a road clearance detector, an airflow generator, and a processor. The processor is configured to allow the airflow generator to generate a downward airflow, on the condition that a road clearance has been on the increase.

For example, when a front wheel runs on a bump in a road surface, a vehicle body exhibits pitching behavior in a nose-up direction. Thus, the road clearance in a front portion of the vehicle body increases temporarily, and space between an underside of the vehicle body and the road surface expands, causing negative pressure in the space, to generate vortex having a volume force in the air. The vortex normally moves upward by an inertial force of the air and collides with the vehicle body, causing air resistance, aerodynamic noise, and aerodynamic vibration. The same applies to a case where a rear wheel runs on the bump.

Supplying the downward airflow to the space where the temporary increase in the road clearance causes the negative pressure makes it possible to suppress the negative pressure and the generation of the vortex. Even in the case with the vortex generated, it is possible to blow away the vortex downward, to suppress the collision of the vortex with the vehicle body. Hence, it is possible to suppress air resistance, aerodynamic noise, and aerodynamic vibration.

According to an aspect of the technology, the processor is configured to allow the airflow generator to generate a backward airflow, on the condition that the road clearance has been on the decrease.

After the vehicle body shifts upward because of, for example, the pitching behavior and reaches a top dead point, the vehicle body comes down and the road clearance decreases. On this occasion, the air between the vehicle body and the road surface is compressed to have a relatively low speed. The backward airflow makes it possible to accelerate the compressed air, and to discharge quickly the accelerated air backward of the vehicle body, suppressing the compressed air from colliding with the vehicle body.

Moreover, the airflow generator may include a plasma actuator. The plasma actuator may include: at least one pair of electrodes; and a power supply configured to apply a voltage to the at least one pair of the electrodes.

Thanks to the simple configuration of the airflow generator devoid of movable components, it is possible to generate the downward airflow and the backward airflow with high responsiveness.

Furthermore, the at least one pair of the electrodes may include a first electrode pair and a second electrode pair. A voltage to be applied to the first electrode pair and a voltage to be applied to the second electrode pair may be configured to be controlled independently. The airflow generator is configured to generate a composite airflow of a first airflow and a second airflow. The first airflow is formed by the first electrode pair. The second airflow is formed by the second electrode pair and moves in a different direction from the first airflow.

This makes it possible to control a direction of airflow generation by the single three-pole plasma actuator. Hence, it is possible to generate airflows in any direction and to simplify the apparatus configuration.

As described, according to the aspects of the technology, it is possible to provide an airflow adjusting apparatus that makes it possible to adjust appropriately airflows between an underside of a vehicle body and a road surface in a case with changes in a road clearance.

The plasma actuator control processor 200 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the plasma actuator control processor 200. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the plasma actuator control processor 200 illustrated in FIG. 4.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An airflow adjusting apparatus to be provided in a vehicle, the vehicle including a vehicle body, a wheel attached to the vehicle body to be partly protruded downward from the vehicle body, and a suspension that holds the wheel to permit the wheel to make a vertical stroke relative to the vehicle body, the airflow adjusting apparatus comprising:
   a road clearance detector configured to detect a road clearance, the road clearance being a vertical distance from a road surface to an underside of the vehicle body;
   an airflow generator provided in an underneath of the vehicle body, and configured to generate an airflow; and
   a processor configured to allow the airflow generator to generate a downward airflow having a downward speed component, on a condition that the road clearance has been on an increase.

2. The airflow adjusting apparatus according to claim 1, wherein
   the processor is configured to allow the airflow generator to generate a backward airflow having a backward speed component, on a condition that the road clearance has been on a decrease.

3. The airflow adjusting apparatus according to claim 2, wherein
   the airflow generator includes a plasma actuator including:
      at least one pair of electrodes; and
      a power supply configured to apply a voltage to the at least one pair of the electrodes.

4. The airflow adjusting apparatus according to claim 3, wherein
   the at least one pair of the electrodes include a first electrode pair and a second electrode pair, with a voltage to be applied to the first electrode pair and a voltage to be applied to the second electrode pair being configured to be controlled independently, and
   the airflow generator is configured to generate a composite airflow of a first airflow and a second airflow, the first airflow being formed by the first electrode pair, and the second airflow being formed by the second electrode pair and moving in a different direction from the first airflow.

5. The airflow adjusting apparatus according to claim 1, wherein
   the airflow generator includes a plasma actuator including:
      at least one pair of electrodes; and
      a power supply configured to apply a voltage to the at least one pair of the electrodes.

6. The airflow adjusting apparatus according to claim 5, wherein
   the at least one pair of the electrodes include a first electrode pair and a second electrode pair, with a voltage to be applied to the first electrode pair and a voltage to be applied to the second electrode pair being configured to be controlled independently, and
   the airflow generator is configured to generate a composite airflow of a first airflow and a second airflow, the first airflow being formed by the first electrode pair, and the second airflow being formed by the second electrode pair and moving in a different direction from the first airflow.

7. An airflow adjusting apparatus to be provided in a vehicle, the vehicle including a vehicle body, a wheel attached to the vehicle body to be partly protruded downward from the vehicle body, and a suspension that holds the wheel to permit the wheel to make a vertical stroke relative to the vehicle body, the airflow adjusting apparatus comprising:
   a road clearance detector configured to detect a road clearance, the road clearance being a vertical distance from a road surface to an underside of the vehicle body;
   an airflow generator provided in an underneath of the vehicle body, and configured to generate an airflow; and
   a processor configured to allow the airflow generator to generate a backward airflow having a backward speed component, on a condition that the road clearance has been on a decrease.

8. The airflow adjusting apparatus according to claim 7, wherein
   the airflow generator includes a plasma actuator including:
      at least one pair of electrodes; and
      a power supply configured to apply a voltage to the at least one pair of the electrodes.

9. The airflow adjusting apparatus according to claim 8, wherein
   the at least one pair of the electrodes include a first electrode pair and a second electrode pair, with a voltage to be applied to the first electrode pair and a voltage to be applied to the second electrode pair being configured to be controlled independently, and
   the airflow generator is configured to generate a composite airflow of a first airflow and a second airflow, the first airflow being formed by the first electrode pair, and the second airflow being formed by the second electrode pair and moving in a different direction from the first airflow.

* * * * *